Sept. 29, 1959   R. A. DISCHERT ET AL   2,906,947
SIGNAL WAVE ANALYZER

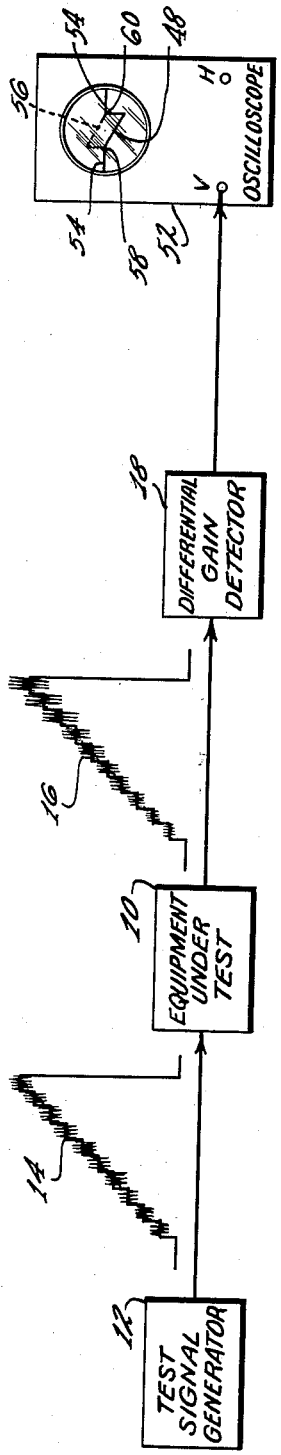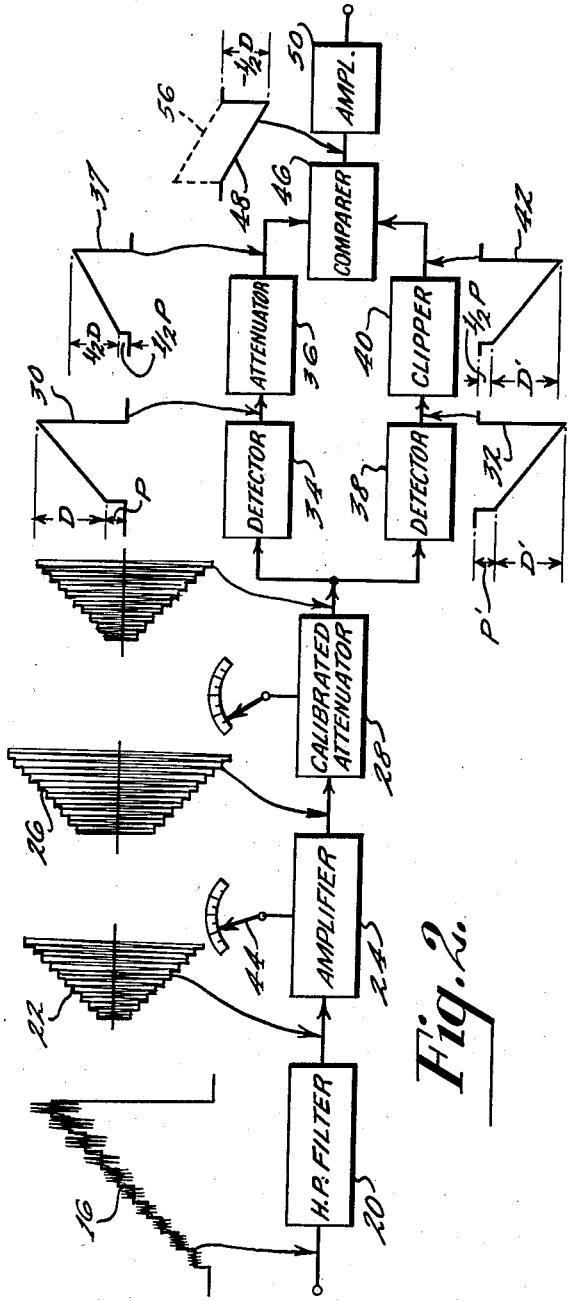

Filed Oct. 26, 1956   2 Sheets-Sheet 2

INVENTORS.
Robert A. Dischert &
Robert G. Thomas
BY
ATTORNEY.

United States Patent Office 2,906,947
Patented Sept. 29, 1959

2,906,947

SIGNAL WAVE ANALYZER

Robert A. Dischert, Merchantville, N.J., and Robert G. Thomas, Havertown, Pa., assignors to Radio Corporation of America, a corporation of Delaware Application October 26, 1956, Serial No. 618,505

12 Claims. (Cl. 324—57)

This invention relates generally to improvements in signal wave analyzers, and more particularly to improved apparatus for measuring the differential gain of an electronic component or system. The apparatus of the present invention is particularly useful as a differential gain detector for measuring amplitude nonlinearity in video amplifiers.

In a transmission system, differential gain is the difference in gain of the system for a small high frequency sine-wave signal at two stated levels of a low frequency signal on which it is superimposed. It is necessary to minimize differential gain to insure that a signal passing through the system is not appreciably degraded.

It has been proposed to check an amplifying system for nonlinearity, for example, by applying to its input a test signal, such as a composite step wave to which has been added a low amplitude, high frequency, sinusoidal wave. The output of the system is then filtered through a high pass filter and displayed on an oscilloscope. Any distortion resulting from the nonlinearity of the amplifier manifests itself by the trace, or contour, of the envelope of the displayed signal on the oscilloscope. When the differential gain of the amplifier under test is greater than about 10 percent, measurements may be made directly on the screen of the oscilloscope. When, however, the differential gain of the amplifier is less than 10 percent, it is difficult to measure the slope of the displayed envelope accurately. This is especially true when the displayed envelope on the oscilloscope has to be amplified, since the nonlinearity of the oscilloscope amplifiers tends to distort the signals displayed thereon.

It is accordingly a general object of the present invention to provide improved apparatus for measuring small differences in amplitude of an alternating current (A.-C.) signal over a finite period of time.

Another object of the present invention is to provide improved apparatus for measuring the differential gain of an amplifier.

Still another object of the present invention is to provide improved apparatus for measuring the differential gain of an electronic unit in a manner whereby the measurement is unaffected by the absolute and/or the differential phase distortion within the electronic unit.

A further object of the present invention is to provide an improved differential gain detector that is particularly useful for measuring the differential gain of wide band video amplifiers.

Still a further object of the present invention is to provide improved apparatus for measuring the differential gain of an electronic component or system at a distance, without the need for a reference signal.

These objects and related advantages of the present invention are attained in improved apparatus particularly adapted to measure small differences in the amplitude of an A.-C. voltage over a finite period of time. This improved apparatus, in the form of a differential gain detector, comprises means to detect the envelope of one polarity of the A.-C. voltage whose differences in amplitude are to be measured. The detected envelope is then attenuated a predetermined amount and applied to a comparer circuit. Means are also provided to clip the detected envelope a predetermined amount and to apply the clipped envelope to the aforementioned comparer circuit. The comparer circuit comprises means to compare the aforementioned attenuated envelope of one polarity with the aforementioned clipped envelope of the opposite polarity in a manner to cancel symmetrical portions of both the clipped envelope and the attenuated envelope and to obtain a difference envelope. The difference envelope is the algebraic sum of the attenuated envelope of one polarity and the clipped envelope of the opposite polarity. The difference envelope may then be displayed on an oscilloscope. The differential gain detector of the present invention comprises a calibrated attenuator for measuring the differences in amplitude of the A.-C. voltage by indicating the degree of attenuation necessary to shift the difference envelope from a first null position on one side of the base line of the oscilloscope to a second null position on the opposite side of the base line.

The novel features of the present invention, as well as the invention itself, both as to its organization and method of operation will be understood in detail from the following description when considered in connection with the accompanying drawing in which similar reference characters represent similar components, and in which:

Fig. 1 is a schematic diagram, in block form, illustrating a system for measuring the differential gain of electronic equipment, in accordance with the present invention;

Fig. 2 is a schematic diagram, in block form, of the differential gain detector shown in Fig. 1;

Figure 3:
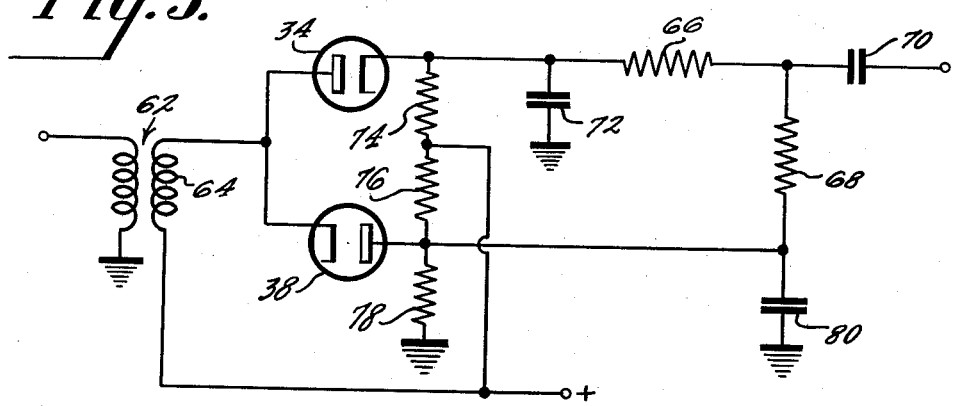
Fig. 3 is a schematic diagram of an embodiment of a portion of the differential gain detector shown in Fig. 2.

Referring now to Fig. 1 there is shown a system, that is, an arrangement of apparatus, for measuring the transfer characteristics, such as the differential gain, for example, of a unit of electronic equipment 10. It will be understood, however, that the equipment 10 under test may comprise an individual unit, such as a video amplifier, or an entire television system. For the sake of simplicity, let it be assumed that the equipment 10, whose differential gain it is desired to measure, is a wideband video amplifier. A test signal generator 12 is connected to the input of the equipment 10 under test, and is adapted to apply thereto a test signal of suitable waveform. A typical test signal waveform comprises the composite of high frequency wave of constant amplitude superimposed on the steps of a step wave. For testing a video amplifier, the step wave may comprise a plurality of steps, each of uniform amplitude, for example, in steps of 0.1 volt and the high frequency sinusoidal wave superimposed thereon may comprise a carrier of 3.58 megacycles (mc.). Such a composite test signal is illustrated by the waveform 14. If the equipment 10 under test were to produce no distortion of the test signal waveform 14, the signal emerging from the equipment 10 would have the same waveform as the input test signal waveform 14. Let us assume, however, that because of the nonlinear transfer characteristic of the equipment 10, the signal emerging from the equipment 10 is distorted, and has the waveform shown by waveform 16.

The differential gain detector 18 comprises means for measuring the distortion of the signal waveform 16.

Referring now to Fig. 2, there are shown the components of the differential gain detector 18 by means of which relatively small differences in the amplitude of an A.-C. signal may be measured. To measure the differential gain of the distorted signal waveform 16, the signal waveform 16 is applied to a high pass filter 20 to filter out the low frequency step wave component and to pass the high frequency component, illustrated by the waveform 22. The output of the high pass filter 20 is applied to the input of a balancing amplifier 24, for the purpose hereinafter appearing, where the waveform 22 is amplified, as illustrated by the waveform 26. The output of the amplifier 24 is then applied to a calibrated attenuator 28, for the purpose hereinafter appearing. The calibrated attenuator 28 is usually set to provide no attenuation until the actual percentage of differential gain is to be measured, as will be explained hereinafter in detail.

The output of the calibrated attenuator 28 is detected to provide the envelope of the A.-C. waveform whose differences in amplitude are to be measured. Thus, means are provided to obtain the positive envelope 30 of the signal whose differential gain is to be measured, and a parallel means are provided to obtain the negative envelope 32 of the signal to be measured. To this end, the output from the calibrated attenuator 28 is channelled along two parallel circuits. In one of these circuits, a detector 34 detects the positive envelope 30 and applies it to an attenuator 36 where the positive envelope is attenuated a predetermined amount, say 50 percent, to produce the attenuated waveform 37. The negative envelope 32 is the result of detecting the output of the calibrating attenuator 28 by a detector 38. The negative envelope 32 is then applied to a clipper 40 where it is clipped a predetermined amount, say 50 percent, to provide the clipped envelope 42.

It will be noted that in the attenuated envelope 37 and in the clipped envelope 42 each waveform comprises two parts, namely, a square wave P and an irregular wave D. By adjusting the gain control 44 of the balancing amplifier 24, the square wave portions of both the attenuated envelope 37 and the clipped envelope 42 may be adjusted to be of equal amplitude, though of opposite polarity. This results from the fact that the attenuated envelope 37 increases in amplitude at a greater rate than the clipped envelope 42 with an increase in the gain of the balancing amplifier 24.

Means are provided to compare the attenuated envelope 37 with the clipped envelope 34 in a manner to cancel the symmetrical portions P of both the attenuated and clipped envelopes and to attain a difference envelope that is the algebraic sum of the attenuated envelope 37 of one polarity and the clipped envelope 42 of the opposite polarity. To this end, the attenuated envelope 37 and the clipped envelope 42 are applied to a comparer circuit 46 to provide at its output a difference envelope 48. The difference envelope 48 may be amplified by an amplifier 50, and applied to the vertical deflection means of an oscilloscope 52. The oscilloscope 52 may be swept by its internal horizontal oscillator to produce any suitable time base, in a manner well known in the art.

To determine the percentage of differential gain of the distorted test signal waveform 16, the gain control 44 of the balancing amplifier 24 is adjusted until the displayed pulse, that is, the difference envelope 48, is coincident with one side of the base line 54, as at point 58. The calibrated attenuator 28 is then adjusted until the difference envelope 48 is moved to the other side of the base line 54 on the screen of the oscilloscope 52, as illustrated by the dashed difference envelope 56. The difference envelope 48 is now in coincidence with the base line 54, as at point 60. To put it another way, the calibrated attenuator 28 is adjusted so that the difference envelope 48 moves from a first null to a second null. The first null is the intersection of the beginning of the trace of the difference envelope 48 and the base line 54, as at point 58.

The second null is the intersection of the end of the trace of the difference envelope 56 with the base line 54, as at point 60.

The calibrated attenuator 28 may be marked in units of percentage of differential gain. Operation of the apparatus shown and described in Fig. 2 is given more in detail in the following. By manipulating the gain control 44 of the balancing amplifier 24, the amplitudes of the waveforms 37 and 42, at the outputs of the attenuator 36 and the clipper 40, respectively, are varied simultaneously at different rates. This results from the fact that the clipped signal 42 is being clipped by the clipper 40 at the same time its amplitude is being varied by the gain control 44 of the amplifier 24, and the amplitude of the signal at the output of the attenuator 36, on the other hand, is merely varied without clipping. It is, therefore, possible to obtain a difference envelope 48 on the oscilloscope 52 wherein the square wave portions P of the attenuated and clipped signals 37 and 42, respectively, have been cancelled.

It is noted that the first null point 58 of the difference envelope 48 represents one extreme point of the portion of the envelope of the test signal where distortion just begins. It is also noted that by attenuating the test signal by the attenuator 28 the first null point 58 is shifed to the second null point 60. Thus, by this manipulation the greatest amplitude of the distorted test signal is reduced to the minimum amplitude of the test signal represented by the first null position 58. In other words, the greatest amplitude of the test signal is attenuated by the calibrated attenuator 28 to the amplitude at which the distortion first appears, as at the beginning of the slope of the test signal. If the calibrated attenuator is calibrated in percent, it may be used to measure the difference in amplitude from one extreme of the test signal to the other extreme of the test signal. Since the difference envelope 48 represents only the distorted portion of the signal, the calibrated attenuator 28 indicates the percent of distortion of the test signal. It is noted that the first null point 58 is produced by varying the gain control 44 of the amplifier 24, and the second null point 60 is brought about by varying the calibrated attenuator 28.

Referring now to Fig. 3, there are shown, in detail, the aforementioned means for detecting, attenuating, clipping, and comparing the envelopes of the A.-C. signal derived from the calibrated attenuator 28. The A.-C. signal from the calibrated attenuator 28 of Fig. 2 is applied to the detectors 34 and 38, represented in Fig. 3 by the diodes 34 and 38, through a transformer 62. One end of the secondary winding 64 of the transformer 62 is connected to a source of suitable potential, and the other end is connected to the anode of the diode 34 and to the cathode of the diode 38. The cathode of the diode 34 is connected in series with serially connected resistors 66 and 68. The common junction of the resistors 66 and 68 may be connected to the amplifier 50 (Fig. 2) or directly to the vertical deflection means of the oscilloscope 52 (Fig. 1) through a capacitor 70. The cathode of the diode 34 is also connected to ground, through a capacitor 72, and to the anode of the diode 38, through serially connected resistors 74 and 76. The common junction of the resistors 74 and 76 is connected to the aforementioned source of operating potential. The anode of the diode 38 is connected to ground through a biasing resistor 78, and also through a capacitor 80.

The diode 38 is biased to clip the negative envelope of the input A.-C. signal and to store the clipped envelope on the capacitor 80. The detected positive envelope is stored on the capacitor 72. The resistors 66, 68, and 78 comprise means for attenuating the positive envelope and for comparing it to the clipped negative envelope whereby to produce a difference envelope at the junction of the resistors 66 and 68. This latter difference envelope is the one that is displayed on the oscilloscope 52.

Figure 4:
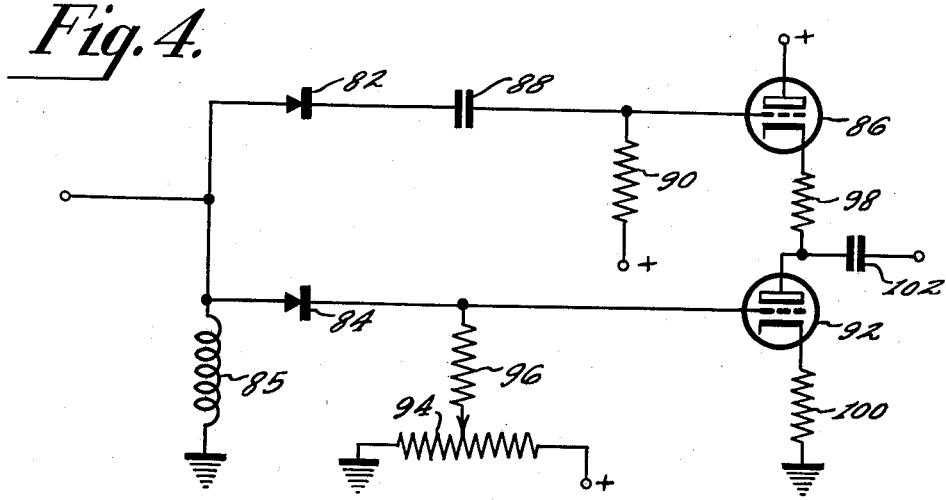
Fig. 4 is a schematic diagram of another embodiment of a portion of the differential gain detector shown in Fig. 2.

Referring now to Fig. 4, there are shown alternative means for detecting, attenuating, clipping, and comparing the envelopes of the A.-C. signal derived from the calibrating attenuator 28. The A.-C. signal whose differences in amplitude over a finite period of time is to be measured is applied from the calibrated attenuator 28 to the anodes of two diodes 82 and 84. The anode of the diode 84 is connected to ground through an inductor 85 having high reactance at the signal frequency. The positive envelope of the A.-C. signal to be measured, derived at the cathode of the diode 82, is applied to the grid of a tube 86 through a capacitor 88. The tube 86 is connected as a cathode follower to provide an attenuated output of signals applied to its grid. The grid of the tube 86 is connected to a suitable source of operating potential through a resistor 90. The anode of the tube 86 is connected to a source of suitable operating potential.

The positive clipped envelope derived from the cathode of the diode 84 is applied to the grid of a tube 92. The cathode of the diode 84 is connected to the movable arm of a potentiometer 94 through a resistor 96. The resistor of the potentiometer 94 is connected across a source of suitable potential. The diode 84 clips by virtue of the bias potential derived from the resistance network of the potentiometer 94 and the resistor 96. It will now be understood that the clipping level of the diode 84 may be adjusted to a proper value by adjusting the potentiometer 94. The cathode of the tube 86 is connected to the anode of the tube 92 through a resistor 98 for the purpose of attenuating signals applied to the grid of the tube 86. The cathode of the tube 92 is connected to ground through a cathode biasing resistor 100. The anode of the tube 92 is connected to the vertical deflection means of the oscilloscope 52, through a capacitor 102, either directly or through the amplifier 50 (Fig. 2).

The operation of the portion of the differential gain detector illustrated in Fig. 4 will now be described. The A.-C. signal applied at the anodes of the diodes 82 and 84 are detected to obtain the positive envelope thereof. The positive envelope from the diode 82 is applied to the grid of the tube 86 and emerges as a positive attenuated envelope at the anode of the tube 92. The positive clipped envelope from the diode 84 is applied to the grid of the tube 92 and emerges at the anode of the tube 92 in inverted polarity. The resulting signal at the anode of the tube 92, applied to the oscilloscope 52, is the algebraic sum of a positive attenuated envelope and a negative clipped envelope. Thus, the cathode follower tube 86 and the tube 92 function as means to compare the attenuated envelope with the clipped envelope to obtain a difference envelope for viewing on the oscilloscope 52.

Figure 5:
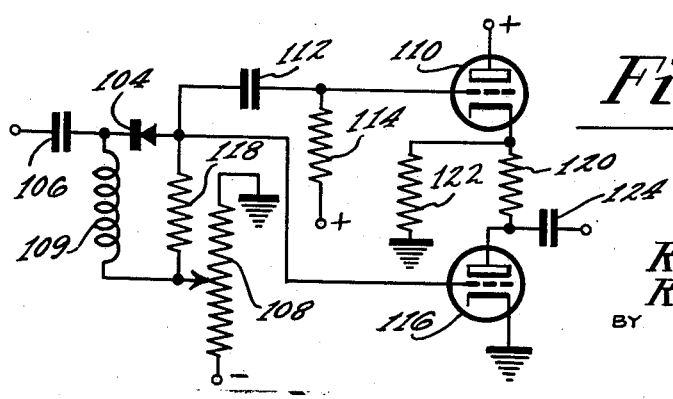
Fig. 5 is a schematic diagram of still another embodiment of a portion of the differential gain detector shown in Fig. 2.

Referring now to Fig. 5, there is shown still another alternative circuit for detecting, attenuating, clipping, and comparing the envelopes of the A.-C. signal derived from the calibrating attenuator 28. The signal from the calibrated attenuator 28 is applied to a diode 104 through a capacitor 106. The common junction of the capacitor 106 and the diode 104 is connected to the movable tap of a potentiometer 108, through a radio frequency choke 109. The resistance of the potentiometer 108 is connected across a source of suitable operating potential. The negative envelope of the A.-C. signal from the anode of the diode 104 is applied to the grid of a tube 110, connected in circuit as a cathode follower, through a capacitor 112, for attenuating and comparing purposes, as explained for the tube 86 in Fig. 4. The grid of the tube 110 is connected to a source of suitable biasing potential through a resistor 114. The anode of the tube 110 is connected to a source of suitable operating potential.

The movable tap of the potentiometer 108 is connected to the grid of a tube 116, through a resistor 118. The tube 116 is connected as a clipping amplifier. The cathode of the tube 116 is connected to ground, and its anode is connected, through a resistor 120 to the cathode of the tube 110. Thus, the tube 116 is connected in circuit as a clipper for clipping the negative detected envelope derived from the anode of the diode 104. A resistor 122 is connected between ground and the cathode of the tube 110 to prevent the tube 110 from cutting off during the clipping operation of the tube 116. A capacitor 124 is connected to the anode of the tube 116 for applying signals therefrom to the oscilloscope 52.

Referring to Fig. 5, it will be understood that the detected negative envelope of the A.-C. signal applied to the diode 104 is applied to the grid of the tube 110, and emerges at the anode of the tube 116, via the resistor 120, as a negative attenuated envelope. The negative envelope from the anode of the diode 104 that is applied to the grid of the tube 116 emerges as a positive clipped envelope at the anode of the tube 116. Thus, the symmetrical portions of opposite polarity of the aforementioned attenuated envelope and the clipped envelope are cancelled, and the difference envelope is applied to the oscilloscope 52 via the capacitor 124. Thus, it will be understood that the circuitry of the tubes 110 and 116 serve as comparing means whereby an attenuated envelope of an A.-C. signal is compared with a clipped envelope of the same A.-C. signal in a manner to produce a difference envelope for viewing on an oscilloscope. Once the difference envelope is displayed on the screen of the oscilloscope 52, the percentage of differential gain may be measured directly on the calibrated attenuator 28 by shifting the difference envelope from a first null point at the beginning of the trace to a second null point at the end of the trace, as from the first null point 58 to the second null point 60. It will also be understood that the symmetrical portion of the attenuated and clipped envelopes may be cancelled by the adjustment of the gain control 44 of the balancing amplifier 24, or by means of an appropriate adjustment of the potentiometer 108.

Thus, there has been described and illustrated improved apparatus for measuring small differences in the amplitude of an A.-C. signal over a period of time, in accordance with the objects and advantages of the present invention. By means of a calibrated attenuator the differences in amplitude are measured directly in units of percentage of differential gain. For example, if a second null point is established by reducing the signal 10 percent with the calibrated attenuator, the differential gain of the equipment under test is 10 percent. It is noted that the apparatus and method of measuring differential gain, as described herein, is independent of any absolute or differential phase distortion within the electronic equipment under test because the output signal is not compared with a standard reference signal. The test signal may be applied to the equipment under test over long distances since the apparatus and method of the present invention do not depend upon a reference signal for comparison purposes. The differential gain may be measured easily and directly in percent even where it is small, for example, as when it is less than 10 percent.

What is claimed is:

1. Apparatus for measuring the difference in amplitude of an alternating current signal over a period of time comprising means to detect the envelope of said signal, means including a first circuit connected to said detecting means to clip said detected envelope, means including a second circuit connected to said detecting means to attenuate said detected envelope, means connected to said first and said second circuits to compare the amplitude of said clipped envelope with the amplitude of said attenuated envelope whereby to obtain a difference envelope, and means connected to said comparing means to indicate the amplitude of said difference envelope whereby it may be measured.

2. Apparatus for measuring the difference in amplitude of an alternating current signal over a period of time comprising means to detect the envelope of said signal over said period, means including a first circuit connected to said detecting means to clip said detected envelope, means including a second circuit connected to said detecting means to attenuate said detected envelope, means connected to said first and said second circuits to compare the amplitude of said clipped envelope with the amplitude of said attenuated envelope whereby to obtain a difference envelope, means connected to said comparing means to display said difference envelope, and calibrated means connected to said detecting means to measure said difference in amplitude of said alternating current signal as a function of the amplitude of said displayed difference envelope.

3. Apparatus for measuring the difference in amplitude of an alternating current signal over a period of time comprising means to detect the envelope of said signal over said period, means including a first circuit connected to said detecting means to clip said detected envelope, means including a second circuit connected to said detecting means to attenuate said detected envelope, means connected to said first and said second circuits to compare the amplitude of said clipped envelope with the amplitude of said attenuated envelope whereby to obtain a difference envelope, means connected to said comparing means to display said difference envelope, and attenuating means connected to said detecting means to attenuate said displayed difference envelope in discrete steps whereby to measure said difference in amplitude of said alternating current signals as a function of the amplitude of said difference envelope.

4. A differential gain detector comprising a calibrated attenuator, means to apply a signal to said calibrated attenuator, means to detect said signal at the output of said calibrated attenuator whereby to obtain its positive and negative envelope, means to attenuate said detected envelope of one polarity, means to clip said detected envelope of the opposite polarity, means to add the amplitude of said attenuated envelope and the amplitude of said clipped envelope whereby to obtain a difference envelope, means connected to said adding means to indicate the amplitude of said difference envelope, and said calibrated attenuator comprising means for attenuating said signal whereby to decrease the greatest amplitude of said difference envelope to zero in a calibrated amount.

5. A differential gain detector comprising an amplifier, means to apply a signal to said amplifier, a calibrated attenuator, means to apply the output of said amplifier to the input of said calibrated attenuator, means to detect said signal at the output of said calibrated attenuator whereby to obtain its positive and negative envelopes, means to attenuate said detected envelope of one polarity, means to clip said detected envelope of the opposite polarity, means to add the amplitude of said attenuated envelope and the amplitude of said clipped envelope whereby to obtain a difference envelope, means connected to said adding means to display said difference envelope, and said calibrated attenuator comprising means for attenuating said signal whereby to decrease the greatest amplitude of said difference envelope to zero in a calibrated amount.

6. A differential gain detector comprising a calibrated attenuator, means to apply a test signal to the input of said calibrated attenuator, means to detect an envelope of the output signal from said calibrated attenuator, a comparer circuit, first circuit means to apply said detected envelope to said comparer circuit, clipping means, second circuit means including said clipping means to apply said detected envelope to said comparer circuit, said comparer circuit comprising means to attenuate the amplitude of said detected envelope applied to it with respect to the amplitude of said clipped envelope, means to indicate the amplitude of the output of said comparer circuit so that it may be measured, and said calibrated attenuator comprising means for attenuating said signal whereby to decrease the greatest amplitude of said difference envelope to zero in a calibrated amount.

7. A differential gain detector comprising a calibrated attenuator, means to apply a test signal to the input of said calibrated attenuator, means to detect envelopes of opposite polarity to each other of the output signal from said calibrated attenuator, a comparer circuit, means to apply one of said detected envelopes of one polarity to said comparer circuit, clipping means, means to apply the other of said detected envelopes of the opposite polarity to said comparer circuit through said clipping means, said comparer circuit comprising means to attenuate the amplitude of said one of said detected envelopes applied to the amplitude of it with respect to said clipped envelope, means connected to said comparer circuit to display the output of said comparer circuit, and said calibrated attenuator comprising means for attenuating said signal whereby to decrease the greatest amplitude of said difference envelope to zero in a calibrated amount.

8. Apparatus adapted to measure the differential gain of equipment to which a test signal has been applied, said test signal comprising a composite of a high frequency wave of constant amplitude superimposed on a wave varying at a relatively lower frequency than said high frequency, said apparatus comprising means including a calibrated attenuator to apply said high frequency wave at the output signal from said equipment to said apparatus, means to detect the envelope of said high frequency wave, means to attenuate said detected envelope, means to clip said detected envelope, means to add algebraically the amplitude of said clipped envelope of one polarity to the amplitude of said attenuated envelope of the opposite polarity to cancel symmetrical portions of said attenuated and clipped envelopes whereby to obtain a difference envelope, means connected to said adding means to display said difference envelope, and said calibrated attenuator comprising means to attenuate said difference envelope in discrete steps whereby it may be measured.

9. Apparatus for measuring a transfer characteristic of equipment with respect to a test signal comprising a composite of a high frequency wave of constant amplitude superimposed on a wave varying at a relatively lower frequency than said high frequency, said apparatus comprising a calibrated attenuator, means to apply said high frequency wave from the output of said equipment to the input of said calibrated attenuator, means to apply the output of said calibrated attenuator to a pair of diodes, means in circuit with said diodes to obtain an envelope of one polarity at the output of one diode and a clipped envelope of an opposite polarity at the output of the other of said diodes, means connected between said diodes to attenuate the amplitude of said envelope of one polarity and to add it algebraically to the amplitude of said clipped envelope, and means connected to said last-mentioned means to apply the algebraic sum of said attenuated envelope and said clipped envelope to display means whereby it may be attenuated by said calibrated attenuator in discrete amounts so that it may be measured as a function of said transfer characteristic.

10. In a system for measuring the differential gain of electronic equipment wherein a test signal comprising a composite of a relatively high frequency wave component of constant amplitude superimposed on a relatively low frequency wave component is applied to the input of said equipment, the combination therewith of means to filter the output of said unit to remove said low frequency wave component from said signal, means to amplify said filtered signal, a calibrated attenuator, means to apply said amplified signal to said calibrated attenuator, means to detect the envelope of one polarity of the output of said signal from said calibrated attenuator, means to detect the envelope of an opposite polarity from the output of said calibrated attenuator, means to attenuate said detected envelope of one polarity with respect to said detected envelope of opposite polarity, means to clip said envelope of opposite polarity, means to add algebraically the amplitude of said attenuated envelope of one polarity to the amplitude of said clipped envelope of opposite polarity, and means connected to said adding means to indicate the algebric sum of said attenuated envelope of one polarity and said clipped envelope of opposite polarity as a difference envelope, said calibrated attenuator comprising means to attenuate said difference envelope in calibrated amounts whereby to measure it.

11. Apparatus adapted to measure differential gain comprising a calibrated attenuator, means to apply a test signal to said attenuator, said test signal comprising a composite of a high frequency component of constant amplitude superimposed on a low frequency component, a first circuit connected to the output of said attenuator and comprising means to detect the envelope of said high frequency component of said test signal and to attenuate said detected envelope, a second circuit connected to the output of said attenuator and comprising means to detect the envelope of said high frequency component of said test signal and to clip said last-mentioned detected envelope, said first and said second circuits being connected in parallel and comprising means to add the amplitude of said attenuated detected envelope to the amplitude of said clipped detected envelope to cancel symmetrical portions of said attenuated and clipped envelopes whereby to produce a resulting difference envelope, means connected to said last-mentioned means to apply said difference envelope to indicating means, and said calibrated attenuator comprising means to attenuate said difference envelope in a calibrated amount to zero whereby to measure it.

12. A differential gain detector comprising an attenuator, means to apply a test signal to said attenuator, said test signal comprising a composite of a high frequency component of constant amplitude superimposed on a low frequency component means connected to the output of said attenuator to detect an envelope of said high frequency component of said test signal, a pair of parallel circuits connected to said detecting means, one of said parallel circuits comprising means to attenuate said detected envelope, the other of said parallel circuits comprising means to clip said detected envelope, said parallel circuits comprising means to add the amplitude of said attenuated detected envelope of one polarity to the amplitude of said clipped envelope of the opposite polarity, means connected to said adding means to apply the resultant of said attenuated detected envelope and said clipped envelope as a difference envelope to indicating means, said calibrated attenuator comprising means to attenuate said difference envelope a calibrated amount to zero whereby to measure it.

References Cited in the file of this patent
UNITED STATES PATENTS

| | | |
|---|---|---|
| 2,618,686 | De Lange | Nov. 18, 1952 |
| 2,625,614 | Schelleng | Jan. 13, 1953 |
| 2,646,545 | King | July 21, 1953 |

OTHER REFERENCES

"Electronics,' August, 1955, pp. 114–117, "Differential Gain Tests TV Color."